Nov. 26, 1935.  R. F. KOHR  2,022,045
BRAKE
Filed Oct. 12, 1933
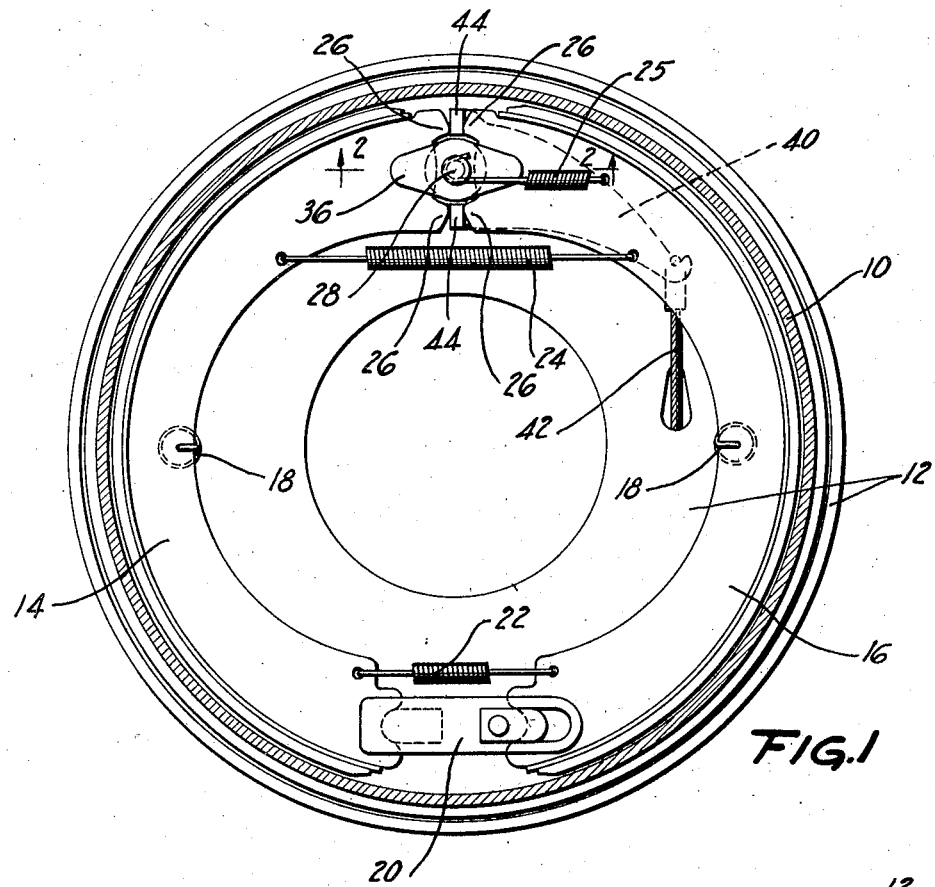
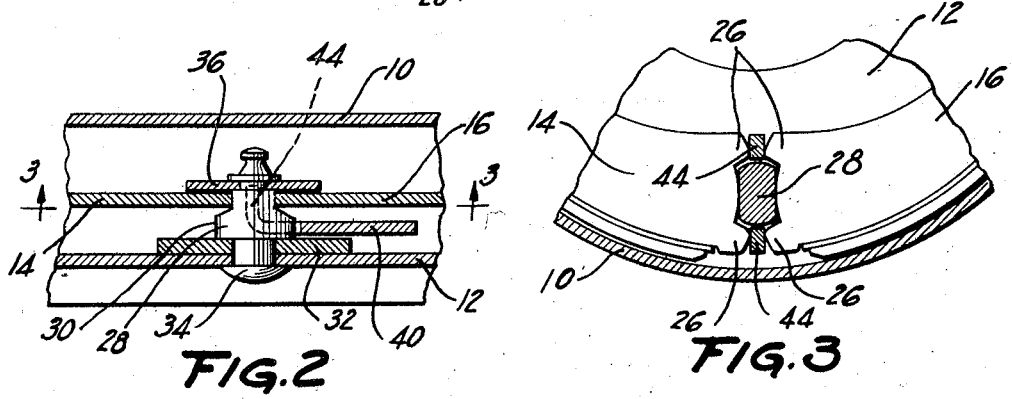
INVENTOR.
ROBERT F. KOHR
BY
ATTORNEY Patented Nov. 26, 1935

2,022,045

UNITED STATES PATENT OFFICE 2,022,045

BRAKE

Robert F. Kohr, South Bend, Ind., assignor to Bendix Brake Company, South Bend, Ind., a corporation of Illinois Application October 12, 1933, Serial No. 693,240

9 Claims. (Cl. 188—78)

This invention relates to brakes, and is illustrated as embodied in an internal expanding automobile brake of the shiftable anchorage type.

An object of the invention is to provide an improved brake anchorage, especially in a brake of this type, permitting the shoe to adjust its position automatically when anchoring. Preferably the anchorage includes a novel anchor post, shown mounted at its end on the brake backing plate, mounted between the ends of the friction means and having flat sides (preferably parallel) slidably engaged by said ends. In the arrangement illustrated, each end of the friction means has a stiffening web the end of which slidably engages the flat side of the anchor and which has a pair of projections arranged on opposite sides of the anchor and which limit radial movement of the friction means.

I prefer to allow the anchored end of the friction means a rocking motion on the anchor, for example by convexly rounding the anchor-engaging surface at the bottom of the shallow notch defined in the end of the web by said projections.

Another feature of the invention relates to the arrangement of the brake-applying lever or its equivalent, it being formed to clear the anchor and having thrust parts extending (on opposite sides of the anchor) between the above-described pairs of projections on the ends of the webs.

The above and other objects and features of the invention, including various novel combinations of parts and desirable particular constructions, will be apparent from the following description of the illustrative embodiment shown in the accompanying drawing, in which:

Figure 1 is a vertical section through the brake, in a plane just inside the head of the brake drum, and showing the brake shoes in side elevation;

Figure 2 is a partial section through the anchor, on the line 2—2 of Figure 1; and Figure 3 is a partial section through the anchor, on the line 3—3 of Figure 2.

The illustrated brake includes a rotatable flanged drum 10, at the open side of which is a support such as a backing plate 12, and within which is arranged the brake friction means, shown as comprising a pair of T-section brake shoes 14 and 16. Each brake shoe has a cylindrical rim carrying the brake lining and reinforced by a stiffening web welded thereto or integral therewith.

The shoes have suitable steady-rest springs 18, and may be adjustably and pivotally connected by a novel wedge device indicated generally at 20, and which is more fully described and which is claimed in my application No. 533,241, filed April 27, 1931, of which the present application is a division. The shoes are held against the device 20 by a spring 22 tensioned between the lower ends of the shoes, while a return spring 24 is tensioned between the upper ends of the shoes, and an auxiliary return spring 25 is arranged to act on shoe 16 only.

The lower ends of the webs of the shoes are formed with rounded notches pivotally engaging corresponding parts of the adjusting device 20. The upper ends of the webs are formed with radially-spaced projections 26, on opposite sides of a novel anchor 28, and which limit the radial movement of the ends of the friction means. Between the projections 26, the end of each web is formed as a shallow notch with a convexly-rounded bottom slidably and pivotally engaging the corresponding flat side of the novel anchor 28. I prefer to make the flat sides of the anchor 28 parallel to each other.

The anchor 28 is shown as a post having a flange 30 seated against a reinforcing plate 32, and having at its end a stem projecting through the backing plate 12 and riveted over to form a head 34, or otherwise formed to be rigidly mounted on the backing plate. The anchor has a slotted washer 36 seated thereon and holding the shoes against lateral movement, and has its end reduced to form an attaching lug for the spring 25.

The brake is applied by means such as a lever 40, arranged beside the shoe 16 and preferably between the shoe web and the backing plate, and which is connected at the end opposite the anchor to a cable or the like 42 which passes at an acute angle through the backing plate and thence through the flexible conduit of a Bowden-type control.

The other end of the lever is cut out or otherwise formed to clear the anchor 28, and has radially-spaced lateral thrust lugs 44 extending between the projections 26.

While one illustrative embodiment has been described in detail, it is not my intention to limit the scope of the invention to that particular embodiment, or otherwise than by the terms of the appended claims.

I claim:

1. A brake comprising, for cooperation with a drum, a pair of shoes within the drum having a floating connection at one side of the drum, a fixed anchor at the other side of the drum between the ends of the shoes and having substantially flat sides slidably engaged by the shoes, and an operating lever arranged beside one of the shoes and having its end formed to clear said anchor and having thrust parts on opposite sides of said anchor projecting between and operatively engageable with the ends of the shoes.

2. A brake comprising, for cooperation with a drum, floating friction means within the drum, a fixed anchor at the side of the drum between the ends of the friction means and having substantially flat sides slidably engaged by said ends, and an operating lever arranged beside one part of the friction means and having its end formed to clear said anchor and having thrust parts on opposite sides of said anchor projecting between and operatively engageable with the ends of the friction means.

3. A brake comprising, for cooperation with a drum, floating friction means within the drum, a fixed anchor at the side of the drum between the ends of the friction means and having substantially flat sides slidably engaged by said ends, said ends of the friction means having projections on opposite sides of the anchor limiting the sliding of the ends on the anchor and having between the projections shallow notches, the bottoms of which are convexly rounded and slidably and pivotally engage the flat sides of the anchor, and an operating lever arranged beside one part of the friction means and having its end formed to clear said anchor and having thrust parts on opposite sides of said anchor projecting between and operatively engageable with said projections.

4. A brake comprising, for cooperation with a drum, floating friction means within the drum, a fixed anchor at the side of the drum between the ends of the friction means and having substantially flat sides slidably engaged by said ends, said ends of the friction means having projections on opposite sides of the anchor limiting the sliding of the ends on the anchor, and an operating lever arranged beside one part of the friction means and having its end formed to clear said anchor and having thrust parts on opposite sides of said anchor projecting between and operatively engageable with said projections.

5. A brake comprising, for cooperation with a drum, floating friction means within the drum having its adjacent ends each formed with a pair of projections spaced radially of the brake and with a shallow notch between said projections, the bottom of which is convexly rounded, and an anchor between said ends embraced between the two sets of projections to limit the radial movement of said ends and slidably and pivotally engaged by the convexly-rounded bottoms of said notches.

6. A brake comprising, for cooperation with a drum, floating friction means within the drum having its adjacent ends each formed with a pair of projections spaced radially of the brake and with a shallow notch between said projections, and an anchor between said ends embraced between the two sets of projections to limit the radial movement of said ends and slidably engaged by the bottoms of said notches.

7. A brake comprising floating friction means having adjacent ends provided with stiffening webs, the ends of which have convexly-rounded portions, an anchor between said ends having flat sides slidably and pivotally engaged by said rounded portions of the ends of said webs and having rounded sides connecting the flat sides and an operating lever beside said friction means having parts movable over said rounded sides of the anchor and in thrust engagement with the ends of the friction means.

8. A brake shoe formed for engagement with adjusting means at one end and having at its other end a stiffening web formed with radially-spaced projections and with a shallow notch between said projections, the bottom of which is convexly rounded.

9. A brake shoe formed for engagement with adjusting means at one end and having at its other end a stiffening web formed with radially-spaced projections and with a shallow notch between said projections, said notch having a convex rounded bottom, in combination with an anchor having a non-cylindrical surface slidably and pivotally engaged by said convex rounded bottom.

ROBERT F. KOHR.